United States Patent
Zahemszky et al.

(10) Patent No.: US 8,681,792 B2
(45) Date of Patent: Mar. 25, 2014

(54) PACKET FORWARDING IN A NETWORK

(75) Inventors: András Zahemszky, Espoo (FI); Jari Keinänen, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 281 days.

(21) Appl. No.: 13/319,439

(22) PCT Filed: Dec. 3, 2009

(86) PCT No.: PCT/EP2009/066312
§ 371 (c)(1),
(2), (4) Date: Nov. 8, 2011

(87) PCT Pub. No.: WO2010/142356
PCT Pub. Date: Dec. 16, 2010

(65) Prior Publication Data
US 2012/0051363 A1    Mar. 1, 2012

Related U.S. Application Data

(60) Provisional application No. 61/185,265, filed on Jun. 9, 2009.

(51) Int. Cl.
*H04L 12/56*    (2011.01)
(52) U.S. Cl.
USPC ............................. 370/392; 370/252; 370/401
(58) Field of Classification Search
USPC ............ 370/392, 310, 255–256, 252, 395.32, 370/395.5, 401; 709/220, 223–224; 713/201
See application file for complete search history.

(56) References Cited

U.S. PATENT DOCUMENTS

| 7,369,557 | B1 | 5/2008 | Sinha | |
|---|---|---|---|---|
| 2005/0108368 | A1* | 5/2005 | Mohan et al. | 709/220 |
| 2005/0132219 | A1* | 6/2005 | Robert | 713/201 |
| 2007/0091828 | A1* | 4/2007 | Ashwood-Smith | 370/256 |
| 2008/0002599 | A1* | 1/2008 | Yau et al. | 370/310 |
| 2010/0169471 | A1* | 7/2010 | Allan | 709/223 |

FOREIGN PATENT DOCUMENTS

WO    WO 2010/022767 A1    3/2010
WO    WO 2010/022799 A1    3/2010

OTHER PUBLICATIONS

International Search Report, PCT International Application No. PCT/EP2009/066312, Feb. 15, 2010.
Written Opinion of the International Searching Authority, PCT International Application No. PCT/EP2009/066312, Feb. 15, 2010.

(Continued)

*Primary Examiner* — Michael Thier
*Assistant Examiner* — Vincelas Louis
(74) *Attorney, Agent, or Firm* — Myers Bigel Sibley & Sajovec, P.A.

(57) ABSTRACT

A method and apparatus routes packets through a network. A network node has outgoing links each associated with at least one link ID. At least one of the links is associated with link IDs. A received packet includes a state variable and routing information which encodes a set of link IDs associated with respective links forming a path through the network. The encoding forms a probabilistic data structure used to test whether a link ID is a member of the set of link IDs. For each of the plurality of outgoing links, the data structure is tested for membership of the link's associated link ID.

19 Claims, 9 Drawing Sheets

(56) References Cited

OTHER PUBLICATIONS

Written Opinion of the International Preliminary Examining Authority, PCT International Application No. PCT/EP2009/066312, Jul. 4, 2011.
International Preliminary Report on Patentability, PCT International Application No. PCT/EP2009/066312, Jul. 29, 2011.
Esteve et al., "Towards a new generation of information-oriented internetworking architectures", *Proceedings of the 2008 ACM CoNEXT Conference—International Conference on Emerging Networking Experiments and Technologies*, Madrid, Spain, Dec. 9, 2008.
Mitzenmacher, "Compressed Bloom Filters", *IEEE/ACM Transactions on Networking*, vol. 10, No. 5, Oct. 2002, pp. 604-612.
Petri et al., "Publish-Subscribe Internet Routing Paradigm", *LIPSIN: Line Speed Publish/Subscribe Inter-Networking TR09-0001, Version 1.0*, Jan. 9, 2009.
Pagh et al., "An Optimal Bloom Filter Replacement", *Proceeding SODA '05—Proceedings of the sixteenth annual ACM-SIAM symposium on Discrete algorithms*, Jan. 2005, pp. 823-829.

* cited by examiner

PACKET FORWARDING IN A NETWORK

CROSS REFERENCE TO RELATED APPLICATIONS

This application is a 35 U.S.C. §371 national stage application of PCT International Application No. PCT/EP2009/066312, filed on 3 Dec. 2009, which itself claims priority to U.S. provisional Patent Application No. 61/185,265, filed 9 Jun. 2009, the disclosure and content of both of which are incorporated by reference herein in their entirety. The above-referenced PCT International Application was published in the English language as International Publication No. WO 2010/142356 A1 on 16 Dec. 2010.

TECHNICAL FIELD

The present invention relates to packet forwarding in a network. In particular it relates to a method in which forwarding information is contained in a packet header so that a network node may determine along which link(s) the packet should be forwarded from the forwarding information in the packet header.

BACKGROUND

Co-pending PCT Patent Application Nos. PCT/EP2008/061167 and PCT/EP2008/063647 disclose a Bloom-filter based source routing solution as the forwarding layer for the publish/subscribe-based networking stack.

By way of a summary of what is disclosed in the above-mentioned PCT applications, consider a network with directed links, where each directed link has a fixed-size link identifier, which has a few bits set to one, and the others are zero. When a delivery path (or a tree) is requested, a topology manager entity performs a bitwise OR operation on the corresponding link identifiers. The result, a small Bloom filter called a zFilter, is passed to the source of the path (tree), and upon forwarding, each node checks which of its link identifiers were added to it by simple and bitwise AND operations.

An important performance indicator of the zFilter-based forwarding layer is the forwarding efficiency, i.e. how much bandwidth is wasted because of false deliveries which were caused by false positives in the time of matching the packet header's zFilter to the outgoing link identifiers (or link identities) when making the forwarding decision. (This is a consequence of the property of Bloom filter as a data structure for storing elements in a compact way.) Formally, forwarding efficiency for a specific delivery tree is the number of links added into the zFilter divided by the number of links the packets use.

To increase the performance of forwarding by reducing false positives, the usage of link identities was proposed in above-mentioned PCT/EP2008/063647. In this solution each link has d different link identities, and the topology manager computes d different zFilter-candidates and chooses the one which is expected to perform the best among of all of the candidates (e.g. having the least number of bits set to one, so that lower number of false deliveries is expected).

Further insight can be achieved from a review of the above-mentioned patent applications PCT/EP2008/061167 and PCT/EP2008/063647.

If the number of false deliveries increases, the probability of the appearance of loops also increases. Consider the simple case where the packet is supposed to traverse through links A->B, B->C and finally C->D. Then, if there is a link between nodes C and A, the packet may be sent over that in the case of a false positive. This way, the packet would get into an infinite loop. Furthermore, the number of the identical packets would increase if the looping packets are not discarded early enough.

Some trivial solutions for solving the problem of the looping packets are disclosed in [P. Jokela, A. Zahemszky, C. Esteve, S. Arianfar and P. Nikander, "LIPSIN: Line speed Publish/Subscribe Inter-Networking", PSIRP technical report, Jan. 11, 2009, published by European Seventh Framework Programme Theme, project Publish-Subscribe Internet Routing Paradigm, Grant agreement no.: 216173] and [P. Jokela, A. Zahemszky, C. Esteve, S. Arianfar and P. Nikander, "LIPSIN: Line speed Publish/Subscribe Inter-Networking", in SIGCOMM '09, August 2009].

One straightforward way is to introduce a time-to-live (TTL) field in the packet header, which is decremented hop-by-hop as the packet traverses the network. Finally, the packet is discarded when the counter reaches zero. When calculating the delivery tree, the topology manager (who is responsible of zFilter-creation) can always adjust the initial time-to-live value to according to the characteristics of the tree (e.g. to the largest publisher-subscriber distance).

A more advanced loop prevention approach is to cache those Bloom filters which may cause loops later. For this, for each node it is to necessary to know the link identifiers (and link identities) pointing to the node from the neighbors (we call them incoming link identifiers/identities). In this solution, the forwarding node checks whether the packet matches to any of its incoming link identifiers in addition to the actual incoming interface. If the Bloom filter matches to more than one interface, it puts a (zFilter, interface id) entry into its loop prevention cache with the interface it received the packet from. When forwarding packets, the node should check whether the zFilter is already in the cache. If not, than the packet can be safely forwarded (and it should be also added into the cache if needed). If the zFilter is present in the cache, the packet is only forwarded if the packet arrived on the same interface which is present in the corresponding entry; otherwise it is dropped, as it arrived on different interface than expected. i.e. a loop is detected.

The present applicant has appreciated that the earlier-proposed loop prevention techniques are costly with regard to resource usage (either state in the nodes or unnecessary bandwidth consumption).

In the pure TTL-based solution, even if the TTL for each delivery tree is set separately, one is still not able to eliminate the loops totally. For example, those loops that are generated close to the source of the tree will still be traversed multiple times by the packet until the TTL eventually reduced to zero, causing harmful multiplication of the packets and therefore decreasing the forwarding efficiency.

The problem of the cache-based loop prevention approach is the increased number of operations it requires from the forwarding node at per-packet basis. Besides the original forwarding decision the node should always compare the packet header's zFilter with the cache entries before forwarding, which can be time-consuming if the amount of entries is high, and can slow down the speed of packet forwarding by orders of magnitude.

To estimate the performance of these two solutions, simulations were performed, and the number of entries needed per nodes in the caching-based solution and the forwarding efficiency experienced by the two different solutions were measured. Simulations were run for different-sized trees (1 publisher+7 subscribers, 1+15, 1+23, 1+31) in different Rocketfuel reference topologies, but the results for one topology are shown here (AS1221, with 104 nodes and 156 links, meaning 302 link identifiers, all link weights assumed to be one) as the results were not qualitatively different.

FIG. 1 of the accompanying drawings shows the results for forwarding efficiency, where it is clear that the gap between the caching-based and the TTL-based loop prevention is huge and increasing when the size of the trees are increased (by size of the tree we mean the number of interested nodes in the publication). FIG. 2 of the accompanying drawings shows the percentage of zFilters put into the caches among all the different zFilters seen in nodes with different degrees. It can be concluded that at least the high-degree nodes cache unacceptably a lot, and as the size of the trees increase, the entries required are also rapidly increasing.

It is desirable to address these issues which the present applicant has appreciated.

SUMMARY

According to a first aspect of the present invention there is provided a method of routing a packet through a network, the method comprising: (a) receiving the packet at a node of the network, the node having available a plurality of outgoing links, with each of the plurality of links being associated with at least one link ID, and at least one of the plurality of links being associated with a plurality of link IDs, the packet comprising a state variable and routing information, the routing information encoding a set of link IDs associated with respective links forming a path through the network, and the encoding being in the form of a probabilistic data structure used to test whether a link ID is a member of the set of link IDs, the test having a possibility of a false positive; (b) for each of the plurality of outgoing links: (i) where the link has more than one associated link ID, using the state variable from the received packet to determine which link ID to use as the associated link ID for the purpose of step (b)(ii); and (ii) testing the data structure for membership of the link's associated link ID; (c) determining a new state variable based at least partly on the state variable from the received packet; and (d) forwarding the packet along each link determined in step (b)(ii) to have its associated link ID as a member of the data structure, the packet comprising the routing information and the new state variable.

The data structure may comprise a Bloom filter.

The packet received in step (a) may comprise an index value, and the determination of step (b)(i) may be made using the index value and the state variable. In this case, the packet forwarded in step (d) would comprise the index value.

The index may be used to determine a function, with the determination of step (b)(i) being made using the determined function, and with the state variable as input to the function.

It may be that each of the plurality of links is associated with a plurality of link IDs. It may also be that each of the plurality of links is associated with a same number of link IDs, as for example might be the case where a plurality of forwarding tables is used.

A time to live variable carried by the packet may be used as the state variable.

The or each link may represent a respective communication path between the node and a respective further node of the network, with the link's associated link ID identifying the communication path or the further node or both. Therefore, a link may be a physical link from the node, to an unspecified remote destination, or a link may merely be a reference to the next node in the path, with an unspecified path.

The new state variable determined in step (c) may be used in step (b)(i) to determine which link ID to use. Therefore, rather than receiving the state variable and using that directly to determine which link ID or routing table to use, and then updating the state variable, one might update the state variable on receipt at the node, with the updated state variable being used in determining which link ID or routing table to use.

The path through the network may comprise a plurality of branches.

According to a second aspect of the present invention there is provided a method of routing a packet through a network, comprising performing a method according to the first aspect of the present invention at each of a plurality of nodes along the path through the network.

According to a third aspect of the present invention there is provided a method of providing the routing information used in a method according to the second aspect of the present invention, comprising, for each of the plurality of nodes along the path through the network: (A) determining what the state variable will be when it reaches the node, based on the manner in which the state variable is updated in step (c) by each preceding node along the path; and (B) for each outgoing link forming part of the path: (i) where the link has more than one associated link ID, using the state variable determined in step (A) to select which link ID to use as the associated link ID for the purpose of step (B)(ii); and (ii) encoding the link's associated link ID into the data structure of the routing information.

According to a fourth aspect of the present invention there is provided an apparatus for use as or as part of a node of a network, for routing a packet through the network, the node having available a plurality of outgoing links, with each of the plurality of links being associated with at least one link ID, and at least one of the plurality of links being associated with a plurality of link IDs, the packet comprising a state variable and routing information, the routing information encoding a set of link IDs associated with respective links forming a path through the network, and the encoding being in the form of a probabilistic data structure used to test whether a link ID is a member of the set of link IDs, the test having a possibility of a false positive; and the apparatus comprising: (a) means for receiving the packet; (b) means for performing steps (i) and (ii) below, for each of the plurality of outgoing links: (i) where the link has more than one associated link ID, using the state variable from the received packet to determine which link ID to use as the associated link ID for the purpose of step (b)(ii); and (ii) testing the data structure for membership of the link's associated link ID; (c) means for determining a new state variable based at least partly on the state variable from the received packet; and (d) means for forwarding the packet along each link determined in step (b)(ii) to have its associated link ID as a member of the data structure, the packet comprising the routing information and the new state variable.

The data structure may comprise a Bloom filter.

Where the packet received by the receiving means (a) comprises an index value, the performing means (b) may be adapted to make the determination of step (i) using the index value and the state variable, with the packet forwarded by the forwarding means (d) comprising the index value.

The performing means (b) may be adapted to use the index to determine a function, with the determination of step (i) being made using the determined function, and with the state variable as input to the function.

The performing means (b) may be adapted to use the new state variable determined by the determining means (c) to determine which link ID to use in step (i).

According to a fifth aspect of the present invention there is provided an apparatus for providing the routing information used in a method according to the second aspect of the present invention, comprising means for, for each of the plurality of nodes along the path through the network: (A) determining what the state variable will be when it reaches the node, in dependence on the manner in which the state variable is updated in step (c) by each preceding node along the path; and (B) for each outgoing link forming part of the path: (i) where the link has more than one associated link ID, using the state variable determined in step (A) to select which link ID to use as the associated link ID for the purpose of step (B)(ii); and (ii) encoding the link's associated link ID into the data structure of the routing information.

According to a sixth aspect of the present invention there is provided a program for controlling an apparatus to perform a method according to the first, second or third aspect of the present invention or which, when loaded into an apparatus, causes the apparatus to become an apparatus according to the fourth or fifth aspect of the present invention. The program may be carried on a carrier medium. The carrier medium may be a storage medium. The carrier medium may be a transmission medium.

According to a seventh aspect of the present invention there is provided an apparatus programmed by a program according to the sixth aspect of the present invention.

According to an eighth aspect of the present invention there is provided a storage medium containing a program according to the sixth aspect of the present invention.

An embodiment of the present invention offers at least one technical advantage of addressing at least one of the issues mentioned above relating to the prior art; this is set out in more detail below.

The probabilistic data structure used in an embodiment of the present invention encodes a set of elements (link IDs), and is used to test whether an element (a link ID) is a member of the set of elements (link IDs). The test would normally be such as to have a possibility of a false positive but no possibility of a false negative. The data structure is probabilistic in the sense that it is a data structure which does not determine with absolute certainty whether or not an element is a member of the set, since there is a probability of a false positive. It is probabilistic as opposed to deterministic. This is the compromise involved in using a compact representation of set membership, such as a Bloom filter, rather than a deterministic or full representation of set membership. It is what leads to the technical problem which the present invention is aimed at addressing.

The probabilistic data structure can be considered to be a space-efficient probabilistic data structure in the sense that is occupies less space than the elements (link IDs) it encodes. In one type of probabilistic data structure, elements (link IDs) can be added to the set of elements (link IDs), but not removed.

DETAILED DESCRIPTION

A method and apparatus embodying the present invention will be described below with reference to FIGS. 8 and 9. Before that, an overview of a scheme embodying the present invention will be described with reference to FIGS. 3 to 7, with some specific examples provided.

The use of multiple forwarding tables was proposed earlier in PCT Patent Application No. PCT/EP2008/063647. In that proposal, the index (d) of the table used is included in all packets and the same index is used for the whole forwarding path/tree. In an embodiment of the present invention an improvement to this scenario is proposed, by having different table indexes based on how many hops the packet has traversed. With this, the aim is to prevent loops caused by false positives when forwarding with zFilters, without adding additional states to the network.

Figure 3:
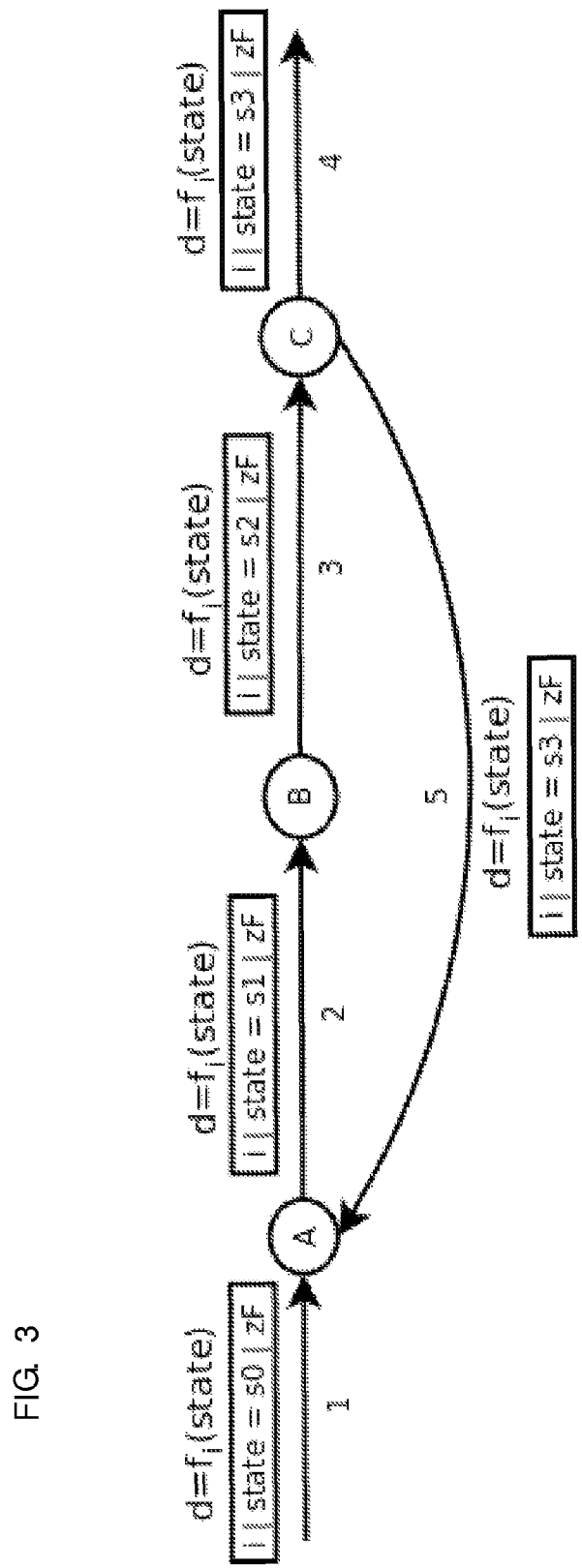
FIG. 3 illustrates the basic concept of an embodiment of the present invention, in a simple network.

A simple topology that could allow packets forwarding in a loop is shown in FIG. 3, consisting of three nodes A, B and C, with five links 1 to 5. Also shown in FIG. 3 are the packet headers as seen by different hops. The packet should go through links 1, 2, 3 and 4 (i.e. these links are encoded into the zFilter zF) but because of a false positive it incorrectly also goes through link number 5.

Figure 1:
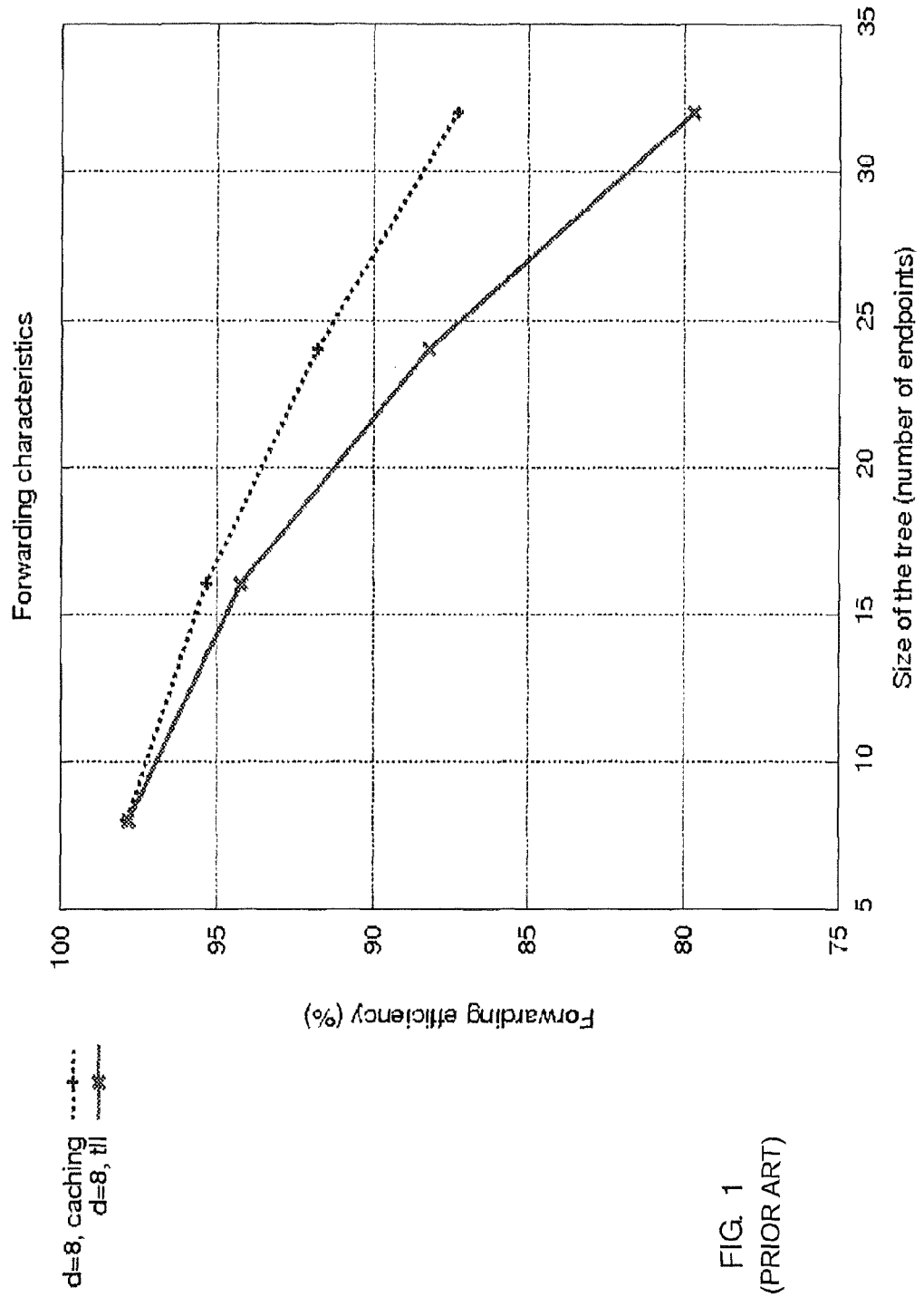
FIG. 1, discussed hereinbefore, is for use in illustrating a problem with a previously-considered approach for loop prevention in the zFilter-based forwarding layer.
Figure 2:
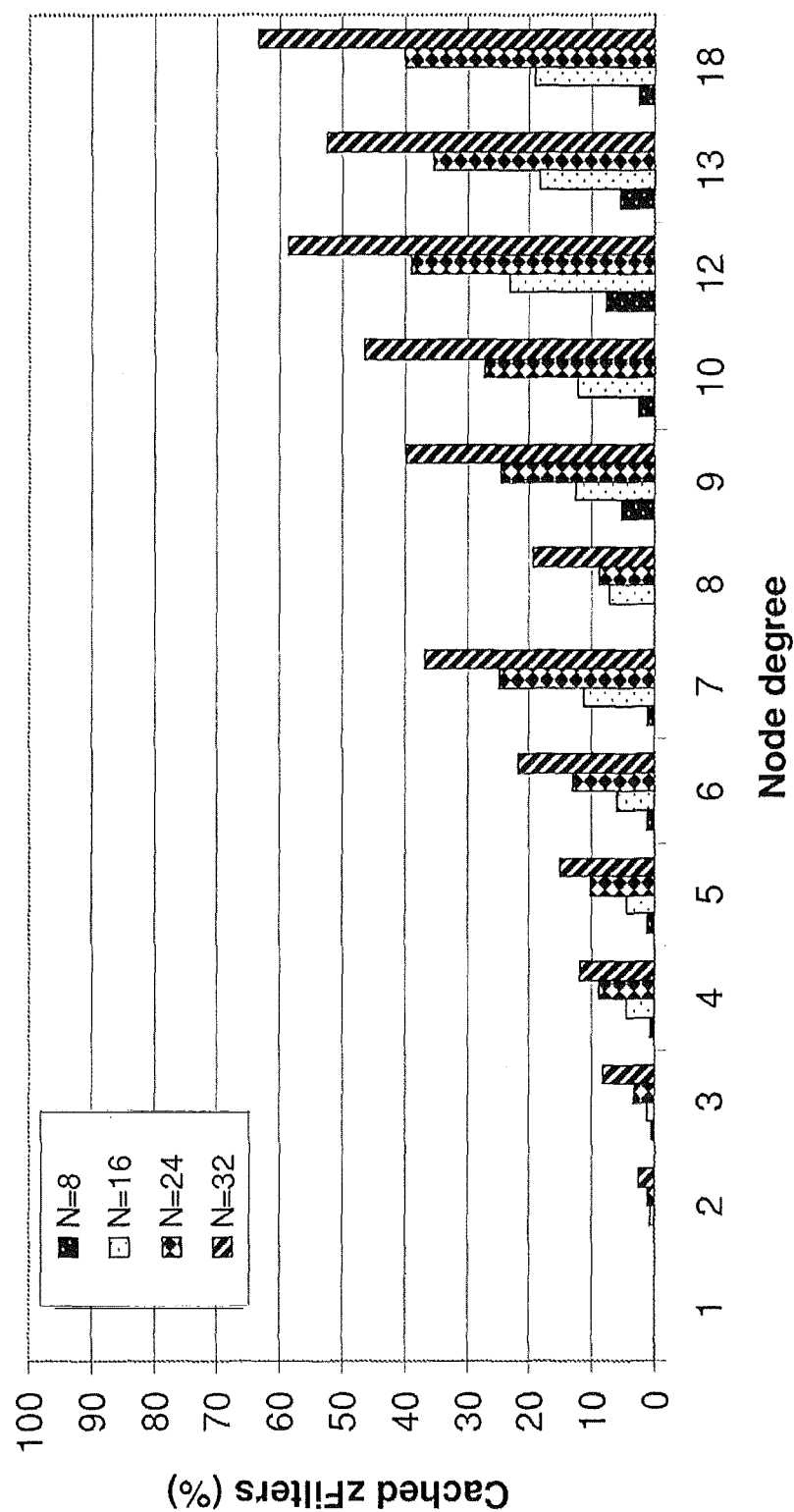
FIG. 2, also discussed hereinbefore, is also for use in illustrating a problem with a previously-considered approach for loop prevention in the zFilter-based forwarding layer.

An embodiment of the present invention uses state information in the packet header to calculate the index d, meaning that the packet will most probably be matched against a different forwarding table when it arrives again at Node A. The state used can be, for example, TTL (as shown in FIG. 1) or some other variable. The d value can be then calculated from the current state variable by for example using modulo operation. This will be described in more detail below.

If the calculated d value happens to be the correct one, or there will be false positive in another forwarding table, the d changes again on the next hop. This way, forwarding for a second time in each hop in the loop will be almost as uncommon as false positives and copied packets will also have a different state so those will be dropped quite fast.

As a refinement of this idea, in one embodiment of the present invention it is proposed to use multiple functions for determining the current forwarding table index (d), with the index of the function being added into the packet header. This index is used to indicate what function should be used. This refinement preserves the possibility of choosing the best zFilter out of multiple candidates, which is an advantageous feature disclosed in PCT/EP2008/063647. In fact, the number of functions that will create different zFilters can be more than the number of forwarding tables, so one can obtain even more zFilter candidates, without adding additional tables (states), than with a constant index. With more candidates, the probability of finding suitable candidates (in the terms of false positive minimization or other policy-enforcements) increases.

Figure 4:
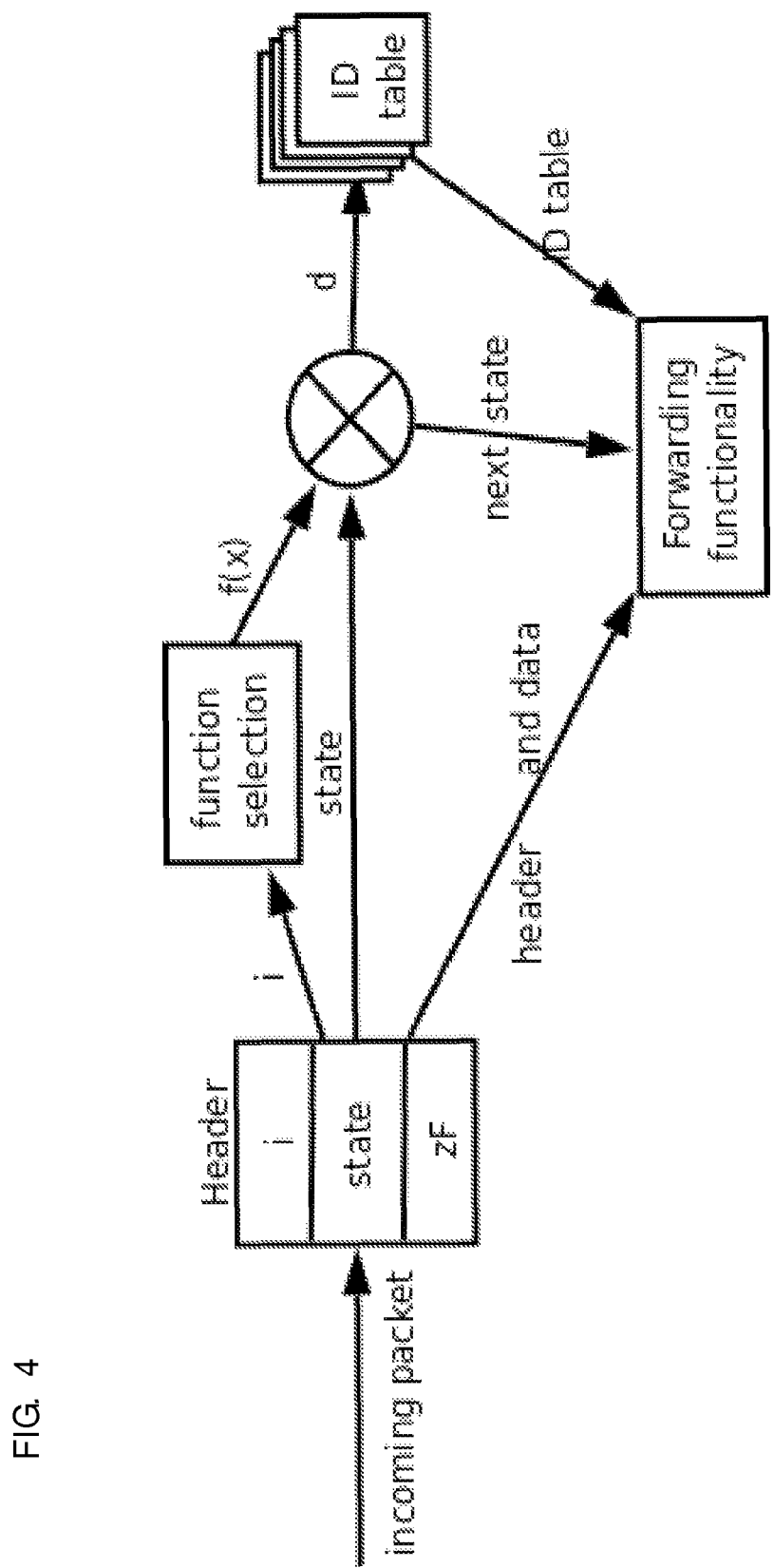
FIG. 4 shows the proposed in-node packet processing architecture according to an embodiment of the present invention.
Figure 5:
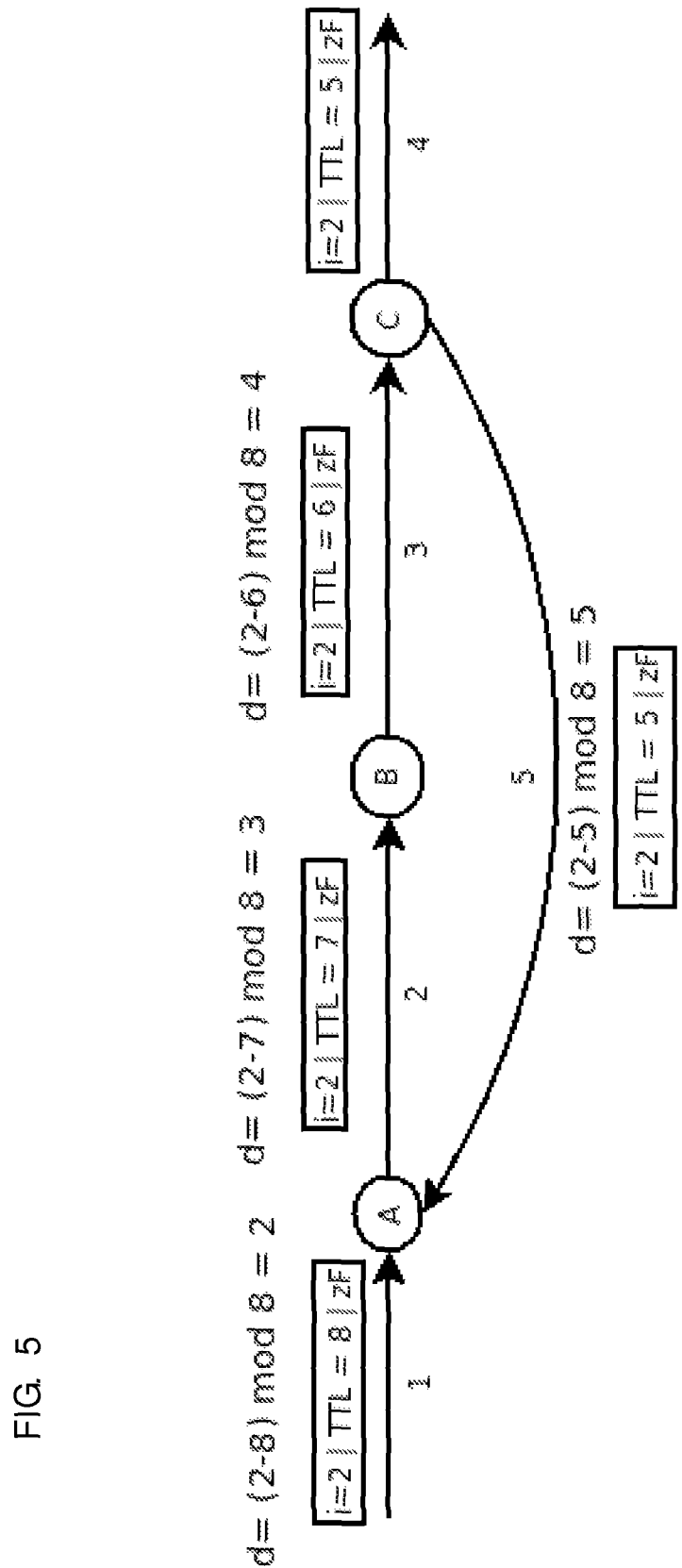
FIG. 5 shows an example implementation, where TTL is used as a state variable and linear sequence is used to determine the actual forwarding table.

The general process of packet handling in the forwarding node of an embodiment of the present invention is shown in FIG. 4, and explained in the following.

The forwarding node performs the following steps upon receiving a packet:
1. The forwarding node reads the function index i from the header and selects the appropriate $f_i$ function based on the index.
2. The function $f_i$ is applied to the state found in the packet header, and the forwarding table index (d) is determined: $d=f_i(\text{state})$
3. The forwarding node determines the outgoing interfaces according to the selected forwarding table
4. If there is at least one interface to forward the packet, the new state of the packet is determined and is written to the packet header (over the previous state). The function to be used is again determined by the function index i, formally: next state=$g_i$(state)
5. The packet is forwarded on the outgoing interface(s)

The forwarding method of an embodiment of the present invention differs from the previously-known method mainly in steps 1, 2 and 4 above.

There are open design choices on how to implement the function selector and how the function is actually used. These choices have an effect on the performance and how many zFilter candidates can be generated. An important restriction that should be naturally taken into account is that the same sequence should be used in zFilter-creation time and on the time of forwarding the packets in the forwarding nodes.

Different implementations are described below for the functions $f_i$ and $g_i$, but first it is explained that the modifications preserve the previously-disclosed zFilter forwarding method (PCT/EP2008/061167 and PCT/EP2008/063647) as a special case.

Assume that each node contains D different forwarding tables. In the previously-disclosed zFilter-based forwarding architecture, the index of the forwarding table was present in the packet header. That functionality can be seen as the special case of an embodiment of the present invention, as applying the trivial function $f_i$=i (for 0 ... d−1) in all the forwarding nodes, and keeping the state variables (i.e. all fields in packet header unchanged). Here nodes still have to implement caching for loop avoidance. Adding the TTL field into the packet header would mean that the state (TTL) is decreased hop-by-hop in all forwarding nodes.

The first design choice is to use a linear sequence by the forwarding nodes hop-by-hop. Informally, this means if the node used the forwarding table with the index 0, the next node(s) should use the one with the index 1 etc. This sequence is periodical, so when the node used the last one, its neighboring node(s) in the delivery tree should use the first forwarding table.

This can be formalized with the usage of the TTL field as a state in the packet header. As state modification, each node decreases the TTL field of the packet upon forwarding. A packet is not forwarded any further by the node if the TTL in the received packet is already zero. The functions that determine the index of the forwarding table to be used are the following:

$$f_i=(i-TTL)\text{MOD }D,$$

where D is the number of forwarding tables, and MOD stands for modulo.

With this technique one can take advantage of having D choices (forwarding tables), with i being in the range of [0 ... D−1].

An advantage of this solution is that the probability of loop avoidance is highly increased, as the packet will hold a different state when it will again appear in the node after completing the loop, so that time the forwarding decision will be made based on a different forwarding table than earlier.

Let one assume that each node has 8 different forwarding tables. Now, on the example of FIG. 5, where node A after receiving the looping packet, will try to match the zFilter with the forwarding table indexed 5, and, if there is no false positive, it will not be forwarded (as normally the forwarding decision should be made in this delivery tree according to the table indexed with 2). If the packet will still continue on the loop, as an additional false positive happened, it will still be discarded reasonably fast as the probability of consecutive false positives quickly decreases and only appears in highly loaded zFilters. In the case when the loop is exactly D hops long, the TTL field will eventually protect against the infinite loops.

The forwarding efficiency of this solution was compared with the forwarding efficiency experienced with: (1) the caching-based loop prevention approach, where d is unchanged; and (2) the time-to-live based loop prevention approach where d is again unchanged.

Figure 6:
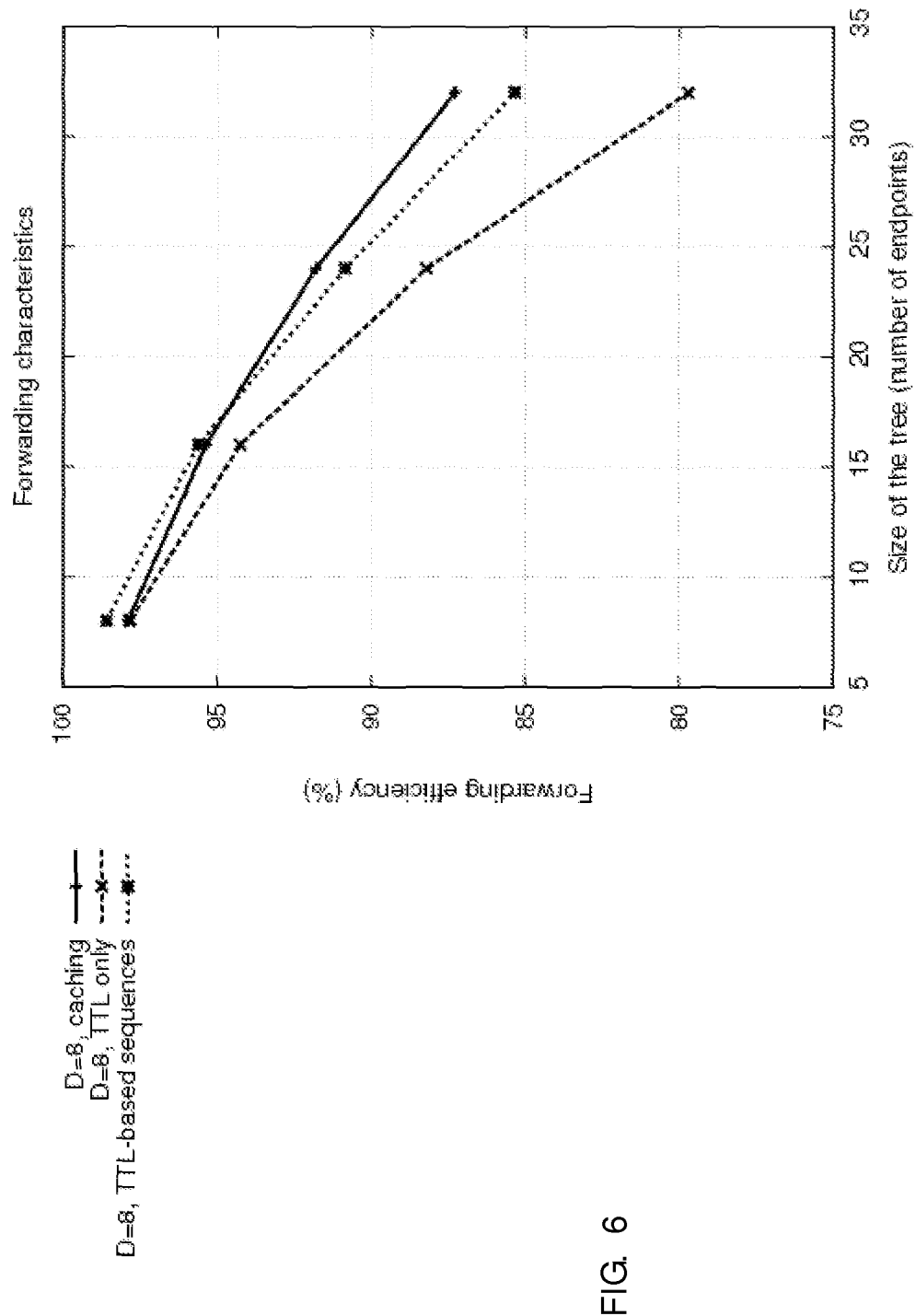
FIG. 6 shows the forwarding performance of the TTL-based linear sequences method compared to the original methods already introduced in FIG. 1.

The simulation results of FIG. 6 suggest that the decrease in the forwarding efficiency is acceptable (may even produce slightly better performance in some topologies with small trees), better than in the case of the exclusive usage of TTL, and besides, the caching of zFilters for loop prevention purposes are totally eliminated.

Now, non-trivial sequences with TTL as the state variable will be considered.

Consider the following functions:

$$d=f_i(TTL)=[(TTL+i)+(TTL+i)/D]\text{ MOD }D$$

$$TTL_{new}=g_i(TTL)=TTL-1,$$

where i is the function index and D is the number of forwarding tables. With this optimization technique one can for example create more than 4 candidate zFilters with only 4 link identities in each link (so we reduced the memory requirement of the parallel forwarding tables).

Figure 7:
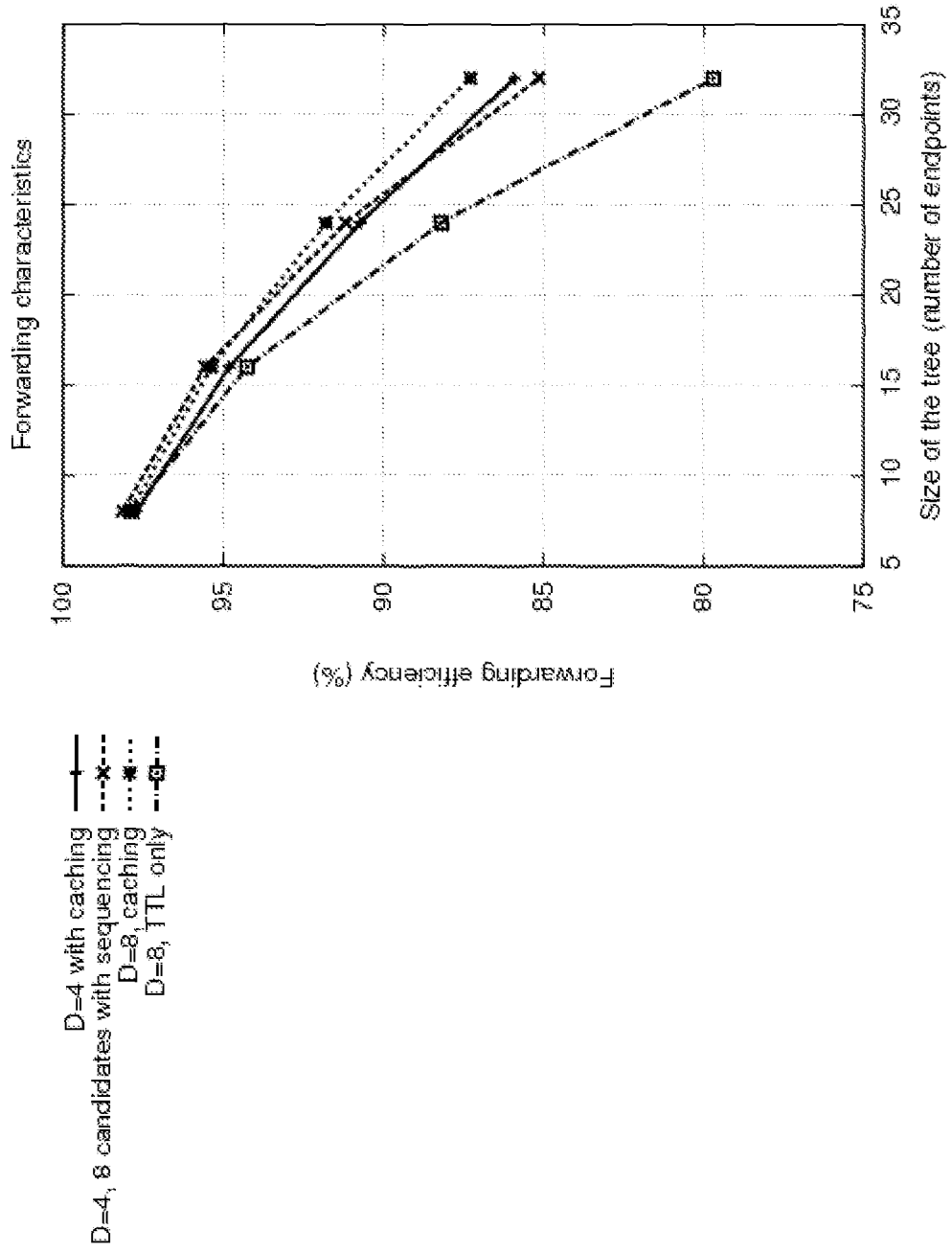
FIG. 7 shows that the non-trivial sequences with TTL can reach almost the same performance with four forwarding tables as the original (caching-based solution, where the same forwarding table index is used by all nodes) method with eight forwarding tables.

The preliminary results for the reference topology (AS1221) are shown on FIG. 7.

FIG. 7 shows that the non-trivial sequences with TTL can reach almost the same performance with 4 forwarding tables as the original (caching-based solution, where the same forwarding table index is used by all nodes) method with 8 forwarding tables. For the sake of easier comparison, the original forwarding solution is shown also with 4 forwarding tables and the pure-TTL based approach is also shown for reference.

The conclusion is that in the region of interest (16 to 24 subscribers per tree, which means around 27 to 36 links in this topology), the forwarding solution with TTL-based loop prevention is feasible if the forwarding table to be used is different hop-by-hop; though it will be worse with bigger trees, but still it avoids costly zFilter-caching and significantly outperforms the pure-TTL based reference approach.

A simple example of a more complex method can be implemented by using the following functions:

$$d=f_i(\text{state})=\text{state MOD }D$$

$$\text{next state}=g_i(\text{state})=\text{state}+i,$$

where i is the function index and D is the number of forwarding tables.

This way, by taking different starting states and different i values, one can generate large amount of different filter candidates. In practice the entity that creates zFilters can try different combinations of i and starting points and create a set of zFilters, and then based on some quality indicator select the best out of those. That indicator can be for example the fill factor (amount of bits set to one compared to the total number of bits) that statistically relates to the false positive rate (power of choices is again preserved).

A general description of a method and an apparatus embodying the present invention will now be described with reference to FIGS. 8 and 9. FIG. 9 illustrates Nodes A to D of a network, as well as a node 1 embodying the present invention. Node A forwards a packet P to node 1, with the packet P comprising routing information to enable the packet P to be forwarded onwards to one or more of Nodes B to D. The manner in which the routing information is used to determine which of Nodes B to D is selected will be described in detail below, but in the illustrated example of FIG. 9, the packet P (in the form of new packet Q) is forwarded to Node B.

Node 1 comprises a packet receiving portion 2, a packet processing portion 4, a state variable updating portion 6, a link ID selection portion 8, a link cycling portion 10, a link ID storage portion 12, a data structure testing portion 14, a packet creation portion 16, a forwarding portion 18 and a plurality of outgoing links 20.

Figure 8:
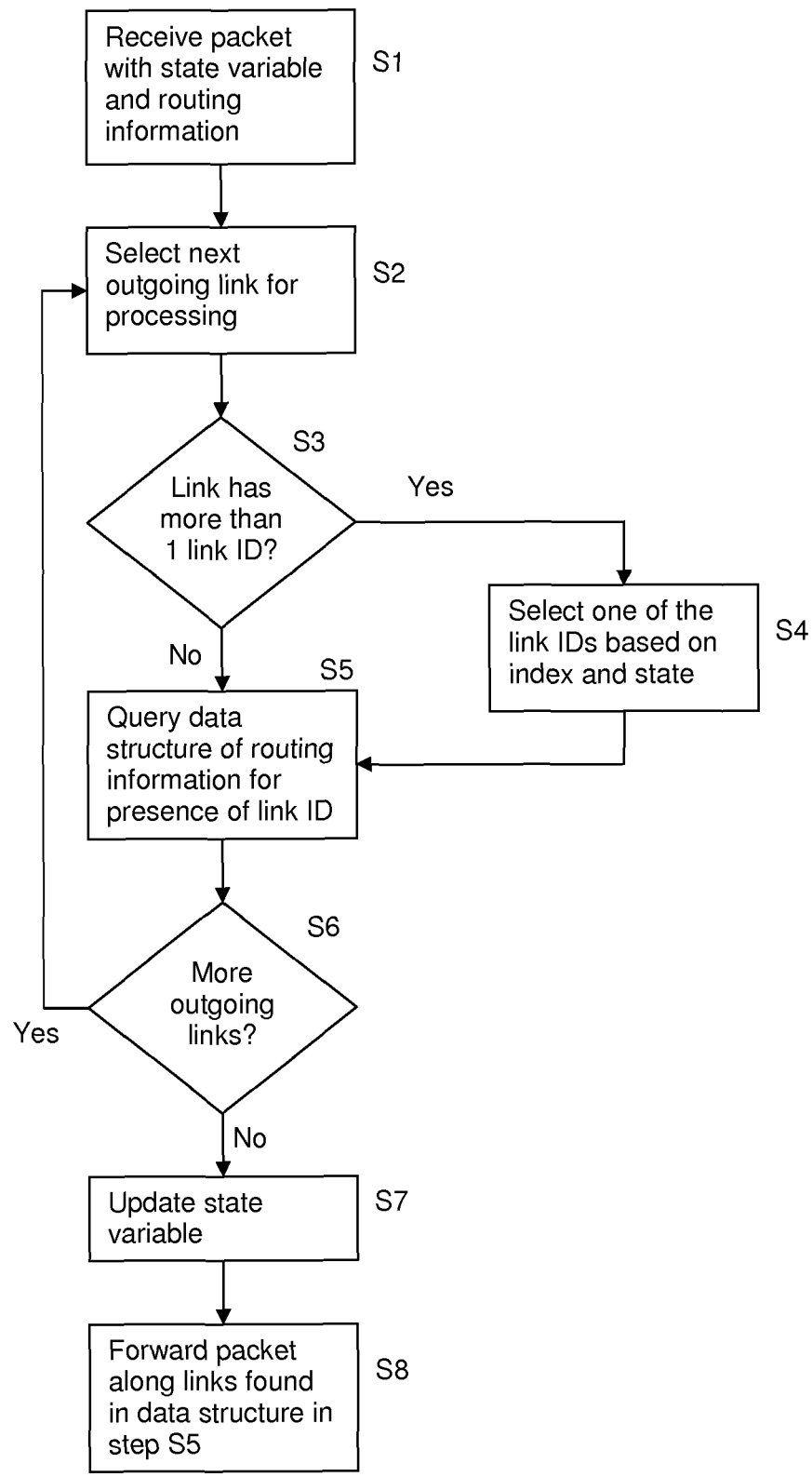
FIG. 8 illustrates schematically a method embodying the present invention.

In step S1 shown in FIG. 8, the packet P is received by the packet receiving portion 2 of the node 1. The packet P is then passed to the packet processing portion 4, which is adapted to extract various pieces of information from the packet P and to make parts of that information available to the state variable updating portion 6, the link ID selection portion 8, the link ID storage portion 12, the data structure testing portion 14 and the packet creation portion 16.

In this respect, the packet P comprises, in a header portion, a state variable, an index value and a probabilistic data structure (e.g. a Bloom filter), as well as a data portion holding the data carried by the packet P. The state variable updating portion 6 is arranged to receive the state variable from the packet processing portion 4, the link ID selection portion 8 is arranged to receive the index value and the state variable from the packet processing portion 4, the data structure testing portion 14 is arranged to receive the data structure from the packet processing portion 4 and the packet creation portion 16 is arranged to receive the index value, the data structure and the data from the packet processing portion 4. The packet creation portion 16 is also arranged to receive a new state variable from the state variable updating portion 6.

Steps S2 to S6 of FIG. 8 are controlled by the link cycling portion 10 of the node 1. In this respect, the node 1 has available a plurality of outgoing links 20, with each of the plurality of links being associated with at least one link ID, and at least one of the plurality of links being associated with a plurality of link IDs. The link cycling portion 10 is adapted to cycle through the plurality of outgoing links 20 and to pass information concerning which link is currently being processed to the link ID selection portion 8 and the forwarding portion 18. In step S2, the link cycling portion 10 selects the next outgoing link for processing. The link ID selection portion checks in step S3 whether the current link has more than one link ID associated with it and, if so, in step S4 the link ID selection portion 8 selects one of the link IDs based on the index value and the state variable received from the packet processing portion 4. If the link ID selection portion 8 determines that the current link has only one link ID associated with it, that link ID is used. The selected (or the only) link ID is fetched from the link ID storage portion 12 and passed to the data structure testing portion 14.

Figure 9:
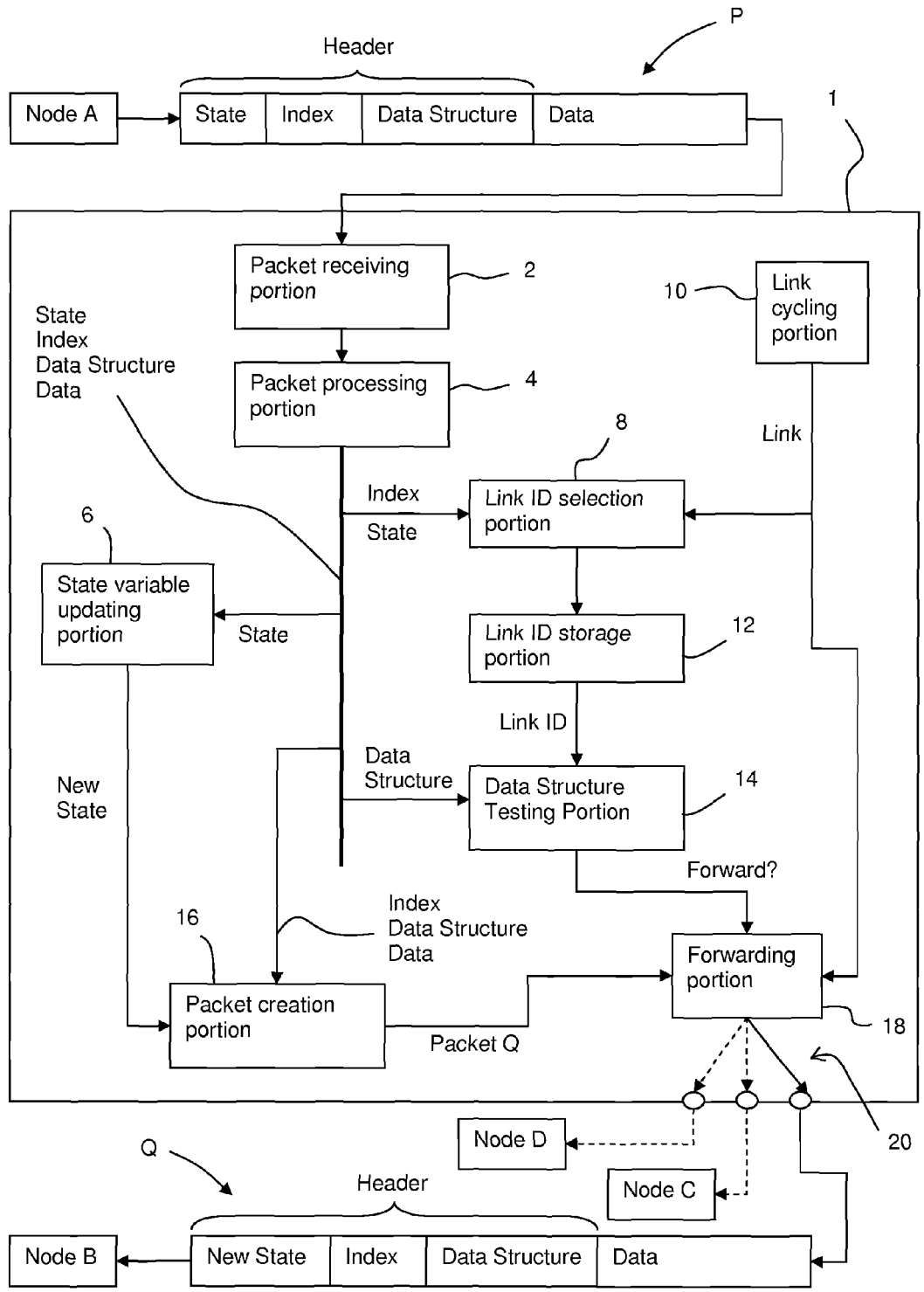
FIG. 9 illustrates schematically a network node embodying the present invention, as well as other nodes of the network.

Relating this back to the previous description, the link ID selection portion 8 of FIG. 9 would be arranged to perform steps 1 and 2 described above with reference to FIG. 4, since the selection of one of a plurality of link IDs is akin to selecting one of a plurality of forwarding tables. The link ID storage portion 12 of FIG. 9 therefore corresponds to the ID table shown in FIG. 4.

In step S5, the data structure testing portion 14 tests the received data structure for membership of the selected link ID, and if the test is positive then a signal is sent to the forwarding portion 18 to inform the forwarding portion 18 that the currently-processed link is to be prepared for forwarding a packet.

The packet to be forwarded by the forwarding portion is prepared by the packet creation portion 16, and includes the index value, data structure and data received from the packet processing portion 4, together with the new state variable received from the state variable updating portion 6. The state variable updating portion 6 determines, in step S7, the new state variable from the previous state variable received from the packet processing portion 4, and various schemes for updating the state variable are described above. The packet Q created by the packet creation portion 16 is sent to the forwarding portion 18, which is adapted to forward the packet Q along the current link if the signal from the data structure testing portion 14 indicates that it should. In the example illustrated in FIG. 9, the data structure testing portion 14 has determined that the forwarding portion 18 should forward the packet Q along the link towards Node B, which is performed in step S8.

The link cycling portion 10 cycles through the remaining outgoing links 20, checking in step S6 whether there are any more outgoing links to process, and looping back to step S2 in dependence upon that check.

It will be appreciated that the new packet Q need be created only once, rather than for each of the outgoing links 20. In addition, although it is described above that the state variable used by the link ID selection portion 8 is the state variable as received by the packet receiving portion 2, with a new state variable being included in the outgoing packet Q, it is also possible that the new state variable itself is used by the link ID selection portion 8; so long as the routing node (the node creating the routing information) is aware of how each node is using and updating the state variable when it creates the routing information, the routing method will operate as intended. It will also be appreciated that the presence and use of an index value is optional, since the link ID selection portion could instead be adapted to select the link ID (or routing table) based on the state variable alone.

An embodiment of the present invention has one or more of the following technical advantages:
  No need to cache zFilters for loop prevention
  Processing speed of the original forwarding method is maintained
  No additional states in the network
  Forwarding efficiency is much higher than with the pure-TTL based loop prevention technique
  More zFilter candidates than forwarding tables. (forwarding efficiency optimization with few states)
  Better chances to find suitable zFilters according to some selection policies
  Flexibility, more zFilter candidates can be tried when there are available resources It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

For example, in the above-described embodiments the routing information is contained in a Bloom Filter. However, the invention is not limited to use of a Bloom Filter, and other compact representations comprising encoding routing information into a set membership that can be interrogated to identify a routing information similar to using a Bloom Filter in functionality may be used such as, for example, the representation described by A Pagh et al. in "An Optimal Bloom Filter Replacement", Proceedings of the sixteenth annual ACM-SIAM symposium on Discrete algorithms, pages 823-829 (2005). The invention may also be effected with modified Bloom filters such as disclosed by, for example, M. Mitzenmacher in "Compressed Bloom Filters", IEEE/ACM Transactions on Networking, Vol. 10, No. 5, p 604 (2002).

As mentioned above, the present invention is based closely on the disclosure contained in PCT Patent Application Nos. PCT/EP2008/061167 and PCT/EP2008/063647, and accordingly the whole content of both of these disclosures is hereby incorporated by reference. Should any part of the above description be regarded as being insufficient to carry out the present invention as set out in the appended claims, reference can be made to the content of these disclosures. Likewise, the content of these disclosures can be used to provide support for the appended claims.

The invention claimed is:

1. A method of routing a packet through a network, the method comprising, at a node of the network:
    (a) receiving the packet,
        the node having available a plurality of outgoing links, with each of the plurality of outgoing links being associated with at least one link identifier (ID), and at least one of the plurality of outgoing links being associated with a plurality of link IDs,
        the packet comprising a state variable and routing information, the routing information encoding a set of link IDs associated with respective links forming a path through the network, and
        the encoding being in the form of a probabilistic data structure used to test whether a link ID is a member of the set of link IDs, the test having a possibility of a false positive;
    (b) for each of the plurality of outgoing links:
        (i) responsive to the outgoing link having more than one associated link ID, using the state variable from the received packet to determine which link ID to use as the associated link ID for the purpose of step (b)(ii); and
        (ii) testing the data structure for membership of the outgoing link's associated link ID;
    (c) determining a new state variable based at least partly on the state variable from the received packet; and
    (d) forwarding the packet along each of the plurality of outgoing links determined in step (b)(ii) to have its associated link ID as a member of the data structure, the packet comprising the routing information and the new state variable.

2. The method as claimed in claim 1, wherein the data structure comprises a Bloom filter.

3. The method as claimed in claim 1,
    wherein the packet received in step (a) comprises an index value,
    wherein the determination of step (b)(i) is made using the index value and the state variable, and
    wherein the packet forwarded in step (d) comprises the index value.

4. The method as claimed in claim 3, wherein the index is used to determine a function, and the determination of step (b)(i) is made using the determined function, with the state variable as input to the function.

5. The method as claimed in claim 1, wherein each of the plurality of outgoing links is associated with a plurality of link IDs.

6. The method as claimed in claim 5, wherein each of the plurality of outgoing links is associated with a same number of link IDs.

7. The method as claimed in claim 1, wherein a time to live variable carried by the packet is used as the state variable.

8. The method as claimed in claim 1, wherein each of the plurality of outgoing links represents a respective communication path between the node and a respective further node of the network, with the outgoing link's associated link ID identifying the communication path or the further node or both.

9. The method as claimed in claim 1, wherein the new state variable determined in step (c) is used in step (b)(i) to determine which link ID to use.

10. The method as claimed in claim 1, wherein the path through the network comprises a plurality of branches.

11. The method as claimed in claim 1, further comprising performing steps (a), (b), (c), and (d) at each of a plurality of nodes along the path through the network.

12. The method as claimed in claim 11, further comprising, for each of the plurality of nodes along the path through the network: (A) determining what the state variable will be when it reaches the node, in dependence on the manner in which the state variable is updated in step (c) by each preceding node along the path; and (B) for each of the plurality of outgoing links forming part of the path: (i) where the outgoing link has more than one associated link ID, using the state variable determined in step (A) to select which link ID to use as the associated link ID for the purpose of step (B)(ii); and (ii) encoding the outgoing link's associated link ID into the data structure of the routing information.

13. A non-transitory storage medium comprising a program for controlling an apparatus to perform the method as claimed in claim 1.

14. An apparatus for use as at least part of a node of a network, for routing a packet through the network, the node having available a plurality of outgoing links, with each of the plurality of links being associated with at least one link identifier (ID), and at least one of the plurality of outgoing links being associated with a plurality of link IDs, the packet comprising a state variable and routing information, the routing information encoding a set of link IDs associated with respective outgoing links forming a path through the network, and the encoding being in the form of a probabilistic data structure used to test whether a link ID is a member of the set of link IDs, the test having a possibility of a false positive; and the apparatus comprising:
    (a) means for receiving the packet;

(b) means for performing steps (i) and (ii) below, for each of the plurality of outgoing links:
  (i) where the outgoing link has more than one associated link ID, using the state variable from the received packet to determine which link ID to use as the associated link ID for the purpose of step (b)(ii); and
  (ii) testing the data structure for membership of the outgoing link's associated link ID;
(c) means for determining a new state variable based at least partly on the state variable from the received packet; and
(d) means for forwarding the packet along each of the plurality of outgoing links determined in step (b)(ii) to have its associated link ID as a member of the data structure, the packet comprising the routing information and the new state variable.

15. The apparatus as claimed in claim 14, wherein the data structure comprises a Bloom filter.

16. The apparatus as claimed in claim 14, wherein, where the packet received by the receiving means (a) comprises an index value, the performing means (b) are adapted to make the determination of step (i) using the index value and the state variable, and wherein the packet forwarded by the forwarding means (d) comprises the index value.

17. The apparatus as claimed in claim 16, wherein the performing means (b) are adapted to use the index to determine a function, and wherein the determination of step (i) is made using the determined function, with the state variable as input to the function.

18. The apparatus as claimed in claim 14, wherein the performing means (b) are adapted to use the new state variable determined by the determining means (c) to determine which link ID to use in step (i).

19. The apparatus claimed in claim 14, comprising means for, for each of the plurality of nodes along the path through the network: (A) determining what the state variable will be when it reaches the node, in dependence on the manner in which the state variable is updated in step (c) by each preceding node along the path; and (B) for each of the plurality of outgoing links forming part of the path:
  (i) where the link has more than one associated link ID, using the state variable determined in step (A) to select which link ID to use as the associated link ID for the purpose of step (B)(ii); and
  (ii) encoding the link's associated link ID into the data structure of the routing information.

* * * * *

UNITED STATES PATENT AND TRADEMARK OFFICE
CERTIFICATE OF CORRECTION

PATENT NO. : 8,681,792 B2
APPLICATION NO. : 13/319439
DATED : March 25, 2014
INVENTOR(S) : Zahemszky et al.

Page 1 of 1

It is certified that error appears in the above-identified patent and that said Letters Patent is hereby corrected as shown below:

In the Specification

In Column 2, Line 21, delete "value to" and insert -- value --, therefor.

In Column 2, Line 40, delete "expected." and insert -- expected, --, therefor.

In the Claims

In Column 14, Line 10, in Claim 19, delete "apparatus" and insert -- apparatus as --, therefor.

Signed and Sealed this
Second Day of September, 2014

Michelle K. Lee
*Deputy Director of the United States Patent and Trademark Office*